United States Patent

[11] 3,631,246

| [72] | Inventor | Herbert H. Defriez<br>Berkeley, Calif. |
|---|---|---|
| [21] | Appl. No. | 33,447 |
| [22] | Filed | Apr. 30, 1970 |
| [45] | Patented | Dec. 28, 1971 |
| [73] | Assignee | Shell Oil Company<br>New York, N.Y. |

[54] METHOD FOR DETERMINING THE PURITY OF RECOVERED SYLVITE
3 Claims, 4 Drawing Figs.

[52] U.S. Cl............................................................ 250/83.3 H,
250/43.5 R
[51] Int. Cl.......................................................... G01n 21/00
[50] Field of Search................................................ 250/43.5 R,
83.3 H; 356/36

[56] References Cited
UNITED STATES PATENTS

| 3,109,932 | 11/1963 | Spitzer.......................... | 250/83.3 H |
| 3,511,570 | 5/1970 | Mogayzel et al.............. | 250/43.5 R X |
| 3,205,355 | 9/1965 | Ehlert............................. | 250/83.3 H X |
| 3,351,757 | 11/1967 | Fraser et al.................... | 250/83.3 H |

*Primary Examiner*—Archie R. Borchelt
*Attorneys*—T. E. Bieber and J. H. McCarthy ABSTRACT: A method for determining the purity of recovered sylvite by taking an infrared spectrum of the sylvite and making up a calibration curve from known standards of a known impurity on the sylvite. The impurity peaks appearing in the infrared spectrum are then compared with the calibration curve and the impurity concentration of the sylvite is determined.

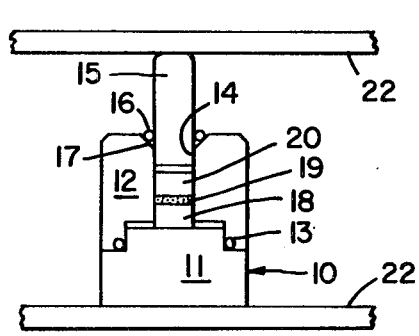
FIG_1
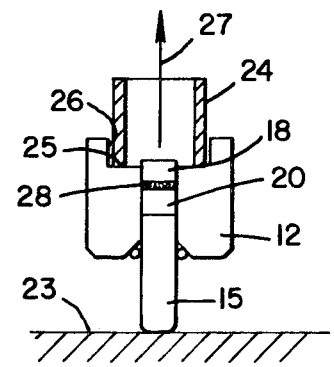
FIG_2
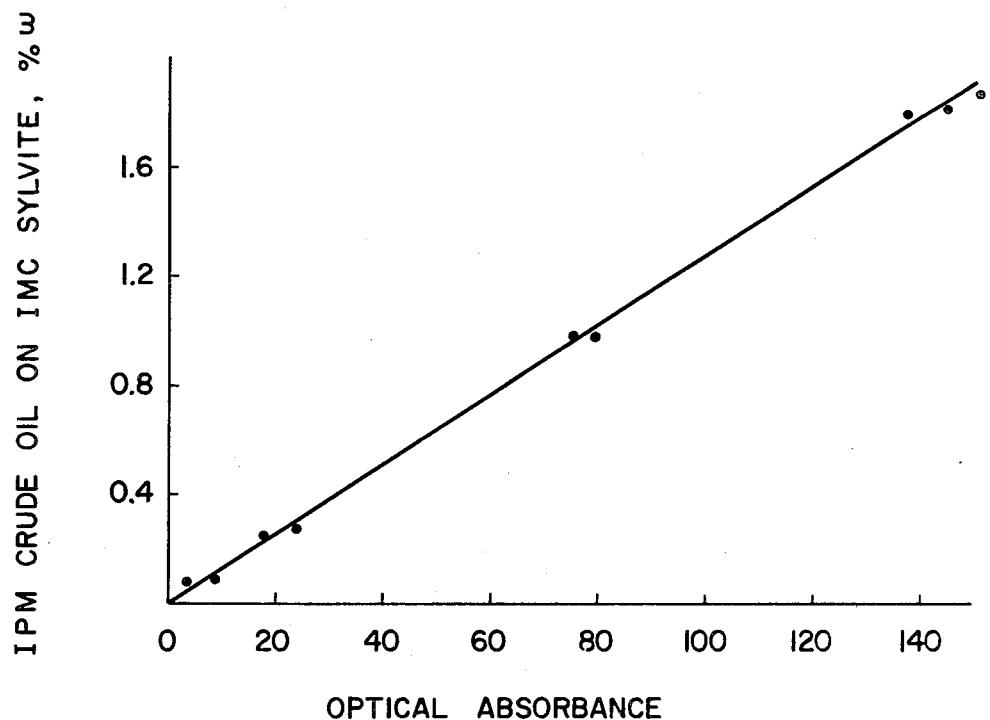
FIG_4
INVENTOR.
HERBERT H. DeFRIEZ
BY
Mellin, Moore & Weissenberger
ATTORNEYS

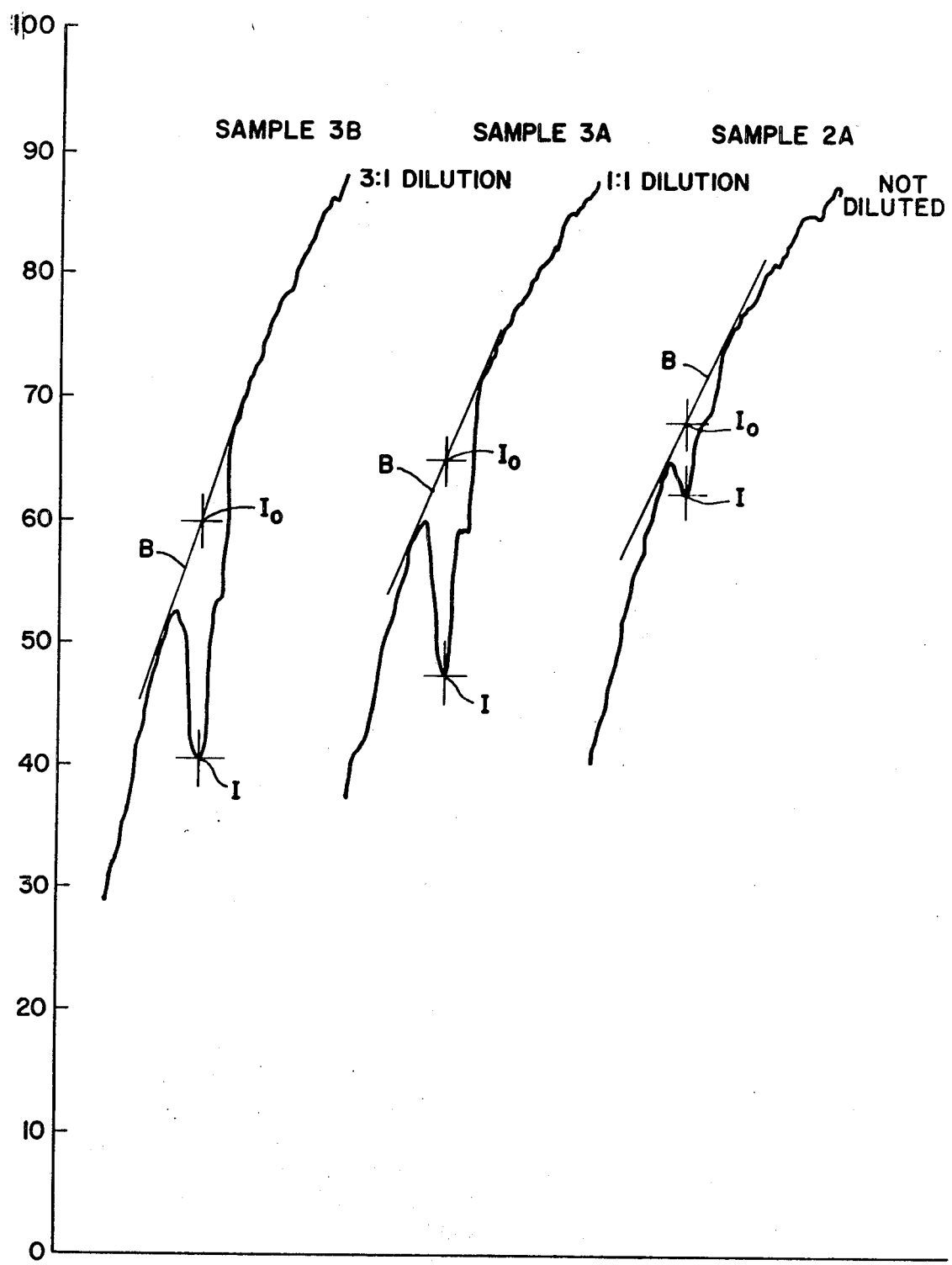
FIG_3

METHOD FOR DETERMINING THE PURITY OF RECOVERED SYLVITE

BACKGROUND OF THE INVENTION

1. Field of the Invention

The invention relates to the purity of materials; and, more particularly, to a method for determining the concentration of an impurity, such as a hydrocarbon, in recovered sylvite.

2. Description of the Prior Art

Water-soluble solids, such as sylvite, can be conveniently and economically transported over great distances through pipelines as heavy suspensions in oily or hydrophobic fluids, such as crude oil or distillates. Recovery of the solid sylvite particles at the receiving end will in some cases be via transfer of the solid particles to an aqueous phase or other suitable methods, such as, for example, the methods described in a copending patent application to June et al., Ser. No. 654,416, filed July 19, 1967, and in a copending patent application to Cheney, Ser. No. 725,053, filed Apr. 29, 1968. After such recovery, it is desirable to know the concentration of hydrocarbon in the recovered sylvite. In the past, conventional extraction methods have been used to obtain such information. However, such extraction methods are generally slow, inaccurate and not reproducible. One such extraction process used on recovered sylvite is the toluene extraction method adapted from the International Minerals and Chemical Corporation method for ether extraction of sylvite. Another prior art process used on recovered sylvite is the benzene extraction of a solution of the contaminated sylvite in water. However, in one experiment using both aforementioned prior art processes, oil contents approximately 50 percent lower than values determined by conventional carbon-hydrogen analysis of similar samples were obtained. These low values resulted from the evaporation step of the aforementioned extraction processes wherein lower boiling components were stripped from the extracted crude oil. Thus, such prior art processes are unsuitable for quick and accurate determinations of the hydrocarbon content of recovered sylvite.

SUMMARY OF THE INVENTION

It is an object of this invention to provide a method for determining the purity of a material.

It is a further object of this invention to provide a method for determining the purity of recovered sylvite.

It is a still further object of this invention to provide a method for determining the purity of sylvite recovered from a slurry of an oil, such as crude oil.

These and other objects are preferably accomplished by taking an infrared spectrum of the sylvite and making up a calibration curve from known standards of a known impurity on the sylvite. The impurity peaks appearing in the infrared spectrum are than compared with the calibration curve and the impurity concentration of sylvite is determined.

Preferably, the sample is in the form of a relatively thin disc pressed from the sylvite, and the known impurity is a hydrocarbon with the calibration curve being made up using a peak corresponding to the carbon-hydrogen stretch bands at approximately 3.4 microns wavelength.

BRIEF DESCRIPTION OF THE DRAWINGS

FIG. 1 is a vertical sectional view of apparatus for carrying out the techniques of my invention;

FIG. 2 is a vertical sectional view, similar to FIG. 1, showing a further step in carrying out my invention; and FIGS. 3 and 4 are graphical illustrations of the technique of my invention.

DESCRIPTION OF THE PREFERRED EMBODIMENT

Although the invention will be described hereinbelow with respect to determining the concentration of crude oil on recovered sylvite (i.e., KC1), the techniques described herein are applicable to the determination of any impurity on sylvite that has an infrared spectrum. Further, these techniques are also applicable to the determination of the concentration of an impurity having an infrared spectrum in any material as long as the infrared absorption lines of the material do not interfere with the infrared absorption lines of the impurity.

It has been found that pure sylvite (i.e., pure KC1) is transparent to infrared radiation between 1 and 15 microns wavelength. If any impurity, such as crude oil, is present on the sylvite, characteristic impurity peaks, such as hydrocarbon peaks, will be present in an infrared spectrum taken of a sample, such as a relatively thin disc, pressed from the contaminated sylvite. A calibration curve is made up corresponding to the type of crude oil and sylvite comprising the sample. Since different crude oils and sylvites have different spectra, separate calibrations must be made for each. However, assuming a sample of crude oil and sylvite, because of its strong absorption and because sylvite has no peaks in this region, the carbon-hydrogen stretch band, at approximately 3.4 microns, may be used to make up a calibration curve from known standards of oil on sylvite. The percent by weight oil on sylvite may then be swiftly and accurately determined for any contaminated sylvite.

It is noted that throughout this specification, the term "impure material" is used to refer to any mixture of crude oil (or any impurity) and sylvite, or, as discussed previously, any impurity and any material, regardless of the percentage of crude oil to sylvite (or impurity to sylvite or material).

First, a sample is taken of the impure material, such as the recovered sylvite, in which the concentration of impurity (such as crude oil) is desired to be determined. This sample is preferably dried, such as by air drying, and, if visibly oily, as for example, more than 0.3 percent by weight after analysis, as will be discussed further hereinbelow, a small amount, such as 100 mg., is taken from the sample, diluted and mixed with exactly 3 times its weight of pure, dry-200 mesh sylvite (i.e., 300 mg.), or a 3:1 dilution. If, however, the sample visually appears moderately oily, as for example, more than 0.15 percent oil after analysis, a small portion thereof, as for example 200 mg., is taken, diluted, and mixed with an exactly equal weight of pure, dry, -200 mesh sylvite, i.e., 200 mg. or a 1:1 dilution. If, of course, the sample visually appears quite clean, i.e., less than 0.15 percent oil after analysis, no dilution is necessary.

Second, approximately 400 mg. of the undiluted sample, or all of the diluted sample, is ground until the sample is completely powdered. The sample is now ready for pressing. For example, a 400 mg. sample may be pressed into approximately three to five thin discs. Of course, in all of the foregoing discussion, a sample of any impure material that can be pressed into flat discs after being powdered may be used with suitable drying means necessary to obtain a usable sample disc.

Referring now to the apparatus of FIG. 1, a die 10 is shown having a base portion 11 and an upper portion 12 adapted to rest on base portion 11. An O-ring 13 is disposed on base portion 11 and slidably fits into upper portion 12. A bore 14 is disposed centrally of upper portion 12. A plunger 15 is disposed in bore 14 and an O-ring 16 is disposed on a downwardly and inwardly tapered portion 17 of upper portion 12 as can be seen in FIG. 1.

A flat die or pressure pallet 18 is placed in bore 14 adapted to rest on the uppermost face of lower portion 11 within bore 14. Preferably, the pallet 18 has its polished side facing upwardly. The sample, now a powder 19, is placed above pallet 18 and evenly distributed over the upper face thereof, as by lightly shaking die 10. This distribution may be completed by inserting plunder 15 and rotating plunger 15 a few times by holding it against power 19 with light pressure. The plunger 15 is then withdrawn slowly, so as not to disturb powder 19, and the surface of the powder 19 preferably should be smooth without cracks or pits. A second pallet 20, having its polished surface down, is then dropped above powder 19 and pressed lightly with plunger 15.

It can be seen in FIG. 1 that a die chamber containing powder 19 is formed between upper portion 20 and lower portion 18 of die 10.

The die 10 is now placed in any suitable pressing device such as a conventional press 22, and a pressure of approximately 10 tons is put on die 10 through suitable actuating means (not shown) coupled to press 22 and left thereon for approximately 2 minutes then released.

The press 22 and lower portion 11 of die 10 is removed and, referring now to FIG. 2, the die 10 is inverted and supported on plunger 15 resting on surface 23. A ring 24 or the like is then placed on the bottom of upper portion 12 of die 10 in the well 25 formed therein as can be seen in FIG. 2. Well 25 conforms to the general upper configuration of lower portion 11 as can be seen by a comparison of FIGS. 1 and 2. Ring 24 is so configured that its outer wall abuts the inner wall 26 of well 25 of upper portion 12.

Pressure is now slowly applied to plunger 15, as by gently pushing down on upper portion 12 of die 10, until plunger 15 moves upwardly through bore 14 into ring 24 ad indicated by arrow 27 in FIG. 2. Such pushing is continued until the lower pallet 18 and powder 19 (now a pressed disc 28) clear upper portion 12. The disc 28 may now be removed from die 10 by any suitable means without manual handling, as, for example, by tweezers.

The disc 28 so obtained by the above method is approximately 0.015 inch in thickness (i.e., generally between 0.010 inch and 0.020 inch). If not, the amount of powder 19 used should be corrected and a second disc pressed. An infrared spectrum of disc 28 is preferably taken within 2 hours after pressing.

Any conventional infrared spectrometer may be used to carry out the subsequent tests, as for example, the Beckman IR-4 Spectrophotometer, Catalog No. 6800, manufactured by the Beckman Instruments, Inc. The following is a suggested method for operating the IR-4 Spectrophotometer using the disc or discs 28 obtained in the foregoing steps set forth with respect to FIGS. 1 and 2.

Operating Procedure for the Beckman IR-4 Spectrophotometer

1. The machine is preferably left in the "ON" position with "AUTO" in, the period switch at 32, and the COARSE GAIN on 1.
2. For 0.0 to 0.5 percent oil on sylvite analyses (for higher percentage analyses, see note following step 5 hereinbelow):
   a. The GLOWER ADJUSTMENT knob is turned on.
   b. The GLOWER CURRENT is set at 0.6 amperes, after a 1 minute warmup with the GLOWER ADJUSTMENT knob.
   c. The SCALE SELECTOR is set on 0–100.
   d. The FINE GAIN is set a 4.00 percent.
   e. The COARSE GAIN is set on 10.
   f. The beam pointer is set on db. (Double Beam).
   g. The PERIOD is set on 2 (fastest).
   h. The SLIT CONTROL is set on SELECTOR.
   i. The programmed slit schedule is set by adjusting SLIT WIDTH at 1.75 mm. at 14.00 microns using the knurled wheel marked "SLIT."
   j. The pushbutton console is used to select the scanning speed. A speed of 0.5 is normally used.
   k. The desired starting wavelength is set with "-WAVELENGTH." For routine analysis, a scan between 4.0 and 3.0 microns is taken. The chart is adjusted os that the scan starts on a heavy line (see FIG. 3 which shows sample spectra for IPM Crude Oil on IMC Sylvite). (IPM = Interprovincial Mix — Canadian crude oil from the Interprovincial Pipeline, while IMC = Internationale Minerals and Chemical Corporation).
   l. The chart is engaged.
   m. A disc 28 is placed in one of the holders and both holders are put in the machine—the sample going in the beam nearest the scan table.
   n. With the "WAVELENGTH" set at 4.0 microns, and the disc 28 in place, the reference beam attenuator is moved into the reference beam until the recording pen reads between 8.5 and 9.0 on the chart scale.
   o. To begin scanning, the button marked "SCAN" is punched.
   p. The scan is stopped at the desired wavelength by pushing the STOP button.
   q. After each scan, the disc 28 is removed and its thickness measured to 0.0001 using a precision thickness micrometer (marked divisions of 0.001 or smaller). The sample number, dilution factor as discussed above, and thickness of each disc 28 is recorded on the strip chart (see FIG. 3).
   r. A new disc 28 is put in place and the scanning procedure is repeated until the paper is filled or the disc samples are exhausted. Thus, as can be seen in FIG. 3, reading from left to right, three tests of disc samples are recorded, 3B, 3A and 2A, the sample having dilution ratio factors as indicated and disc thicknesses of 0.0200, 0.00142 and 0.0163, respectively, as recorded in step $q$.
   s. When through scanning, the GLOWER ADJUSTMENT knob is turned off and the COARSE GAIN is set on 1 and the PERIOD is set on 3 32.

NOTE: If the sylvite contains more than 0.5 percent w. oil, a FINE GAIN of 4.00 percent may not be sufficient. To check this, it is necessary to go through Step (n) and note the final reading on the chart scale. The FINE GAIN is unlocked and set at 2.0. The beam pointer is switched to SB (Single Beam). The FINE GAIN is adjusted until the chart reading is the same as before switching to SB; the chart reading is noted. The machine is switched back to db. and the FINE GAIN is set at the whole number nearest twice the value noted while on SB (e.g., while on SB, if the FINE GAIN reads 2.8 —twice this is 5.6; The FINE GAIN is set on 6.00). Then, proceed with step ($o$).

Numerical Evaluation of the Infrared Spectrum

1. An artificial baseline (B) is drawn from the point where the peak appears on the spectrum to the point where the baseline resumes (see FIG. 3).
2. A line is drawn through the center of the largest peak and extended to the baseline. This point is the base point $I_o$.
3. A line is drawn across the top of the peak —this is the peak height $I$.
4. Using Beer's law, the absorbance is equal to the log of the ratio between the base point and the peak height ($A_o = \log I_o/I$sorbance, $A_o$ is calculated and divided by thickness:

$$A = \log I_o/I \times 1/\text{thickness}$$

Absorbance, $A$, is recorded on the spectrum chart.

EXAMPLE

Base point: 68.30
Peak height: 62.4
Thickness: 0.0163 inch
Dilution: None $A = \log 68.3/62.4 \times 1/0.0163 = 0.03941 \times 1/0.0163 = 2.418$.

The resultant absorbance may then be converted to percent by weight oil on sylvite using either an appropriate graph or formula, the formula and graph being different for each different oil used.

5. Absorbance is converted to percent by weight oil. For IPM CRUDE OIL on IMC SYLVITE, the conversion formula is: percent w. $=(0.01271 A)-0.01185$. The conversion graph shown in FIG. 4 may be used for IPM Crude Oil on IMC Sylvite.

EXAMPLE from example above:
$A = 2.418$
percent w. $= (0.01271 \times 2.418) - 0.01185 = 0.029$ percent w.
6. If the sample was diluted, the percent oil must be corrected for this dilution. If diluted 1:1, percent oil is multiplied by 2; if 3:1, by 4. No correction is needed if no dilution was used.
7. The results are recorded.

EXAMPLE (using sample No. 3A from FIG. 3)
(From the Infrared Spectrum) Base point: 64.8
Peak Height: 47.5 Thickness: 0.0142
Dilution: 3:1
$A = \log 64.8/47.5 \times 1/0.0142 = 0.13481 \times 1/0.01429.494$
percent w. $= [(9.4940.01271) - 0.01185] \times 4 = 0.1088 \times 4 = 0.435$ percent w.

In summary, the calibration curve for IPM crude oil on IMC sylvite in FIG. 3 was plotted from master samples whose total oil content was known from carbon and hydrogen analyses. Two sylvite master samples containing 1.82 percent w. and 0.32 percent w. total oil were blended with toluene-extracted and thoroughly dried sylvite to make a series of six different samples of varying oil content. The toluene-extracted sylvite was prepared by multiple extraction of sylvite recovered from a prepilot plant for sylvite/crude oil separation. Recovered, rather than natural sylvite, was used because the recovery process changes the spectrum of sylvite slightly; the infrared spectrum method of our invention as disclosed hereinabove is intended for recovered sylvite samples. The toluene-extracted sylvite contained 0.04 percent w. oil by carbon-hydrogen analysis.

The spectra of FIG. 3 was run for each of the six samples three times. This produced 18 points; data was also included from two spectra of the toluene-extracted sylvite sample and one spectrum of a hearth-dried sylvite sample. For these 21 points, the graph of total oil content (percent w.) vs. optical absorbance was linear (see FIG. 4). A "least squares" straight line for the 21 points is shown in FIG. 4. The formula is: percent w. oil $= (0.01271 \times$ optical absorbance$) - 0.01185$. Standard deviation (68 percent confidence level error) is $\pm 0.03$ percent w.

Because of its strong absorption the carbon-hydrogen stretch band at 3.4 microns was chosen. Sylvite has no peaks in this region. Separate calibrations must be made for different crude oils and for different sylvites because of differences in their spectra.

I claim as my invention:

1. In a method for determining the purity of sylvite transported by pipeline in an oil slurry and subsequently recovered from the oil, the method comprising the steps of:
    taking an infrared spectrum of said sylvite;
    making up a calibration curve from known standards of said oil on said sylvite using a curve peak corresponding to the carbon-hydrocarbon stretch bands at approximately 3.4 microns wavelength;
    comparing the hydrocarbon peaks appearing in said infrared spectrum with said calibration curve; and
    determining the hydrocarbon concentration in said sylvite from said comparison.

2. The method of claim 1 wherein the step of taking an infrared spectrum of said sylvite includes the steps of:
    taking a sample of said sylvite in which the concentration of oil is desired to be determined;
    drying said sample;
    grinding said dried sample until substantially all of said dried sample is substantially completely powdered;
    placing the powdered sample in a die chamber at atmospheric pressure; and
    pressing at least one disc having a thickness between about 0.01 inch and 0.02 inch from said powdered sample.

3. The method of claim 2 wherein the step of drying said sample includes the step of adjusting the dryness of said sample until the concentration of oil in said sample is less than about 0.15 percent by weight.

* * * * *